(12) United States Patent
Naoi (10) Patent No.: US 8,047,701 B2
(45) Date of Patent: Nov. 1, 2011

(54) BATCH MIXER

(75) Inventor: Masaki Naoi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 501 days.

(21) Appl. No.: 11/424,142

(22) Filed: Jun. 14, 2006

(65) Prior Publication Data

US 2007/0025176 A1    Feb. 1, 2007

(30) Foreign Application Priority Data

Jul. 26, 2005  (JP) ................................ 2005-215247

(51) Int. Cl.
*B29B 7/28* (2006.01)

(52) U.S. Cl. ..................................................... 366/76.7

(58) Field of Classification Search ............... 366/76.7, 366/76.1, 76.2, 76.93; 425/204, 208, 209
See application file for complete search history.

(56) References Cited

U.S. PATENT DOCUMENTS

| | | | | |
|---|---|---|---|---|
| 1,279,220 A | * | 9/1918 | Banbury | 366/76.7 |
| 1,279,824 A | * | 9/1918 | Banbury | 366/76.7 |
| 1,435,616 A | * | 11/1922 | Mosher | 366/76.7 |
| 1,713,969 A | * | 5/1929 | Lewis | 366/76.7 |
| 2,446,657 A | * | 8/1948 | MacLeod et al. | 366/76.7 |
| 2,495,241 A | * | 1/1950 | Eaby | 366/76.7 |
| 3,447,201 A | * | 6/1969 | Seanor et al. | 366/76.2 |
| 3,938,104 A | * | 2/1976 | Henry et al. | 711/100 |
| 3,993,219 A | | 11/1976 | Franzosi | |
| 4,455,091 A | * | 6/1984 | Bamberger et al. | 366/76.7 |
| 4,818,113 A | * | 4/1989 | Patel | 366/76.2 |
| 4,830,506 A | | 5/1989 | Borzenski | |
| 4,877,328 A | * | 10/1989 | Muller et al. | 366/76.7 |
| 4,953,984 A | * | 9/1990 | Miyoshi | 366/76.2 |
| 5,061,078 A | * | 10/1991 | Yada | 366/76.2 |
| 5,324,107 A | * | 6/1994 | Tanaka et al. | 366/76.3 |
| 5,460,445 A | * | 10/1995 | Miyoshi et al. | 366/76.7 |

(Continued)

FOREIGN PATENT DOCUMENTS

EP    1 149 673 A1    10/2001

(Continued)

OTHER PUBLICATIONS

Office Action issued Feb. 22, 2011, in Japanese Patent Application No. 2006-186009.

*Primary Examiner* — Charles E Cooley
(74) *Attorney, Agent, or Firm* — Oblon, Spivak, McClelland, Maier & Neustadt, L.L.P.

(57) ABSTRACT

A batch mixer, which includes a floating weight that is freely elevatable by hydraulic cylinders in a hopper which is provided for a mixer main body in a communicated state and into which mixing materials are charged, includes: a linear scale capable of continuously detecting the elevating/lowering position of a floating weight; a position setting device that sets the elevated position of the floating weight; and a control device that controls the elevating/lowering position of the floating weight based on the positional detection signal of the linear scale and the set value of the position setting device. The control device sends a stop signal to a direction switching solenoid valve to stop the action of the hydraulic cylinders when the positional detection signal matches the positional set value. With such a constitution, the stop position of the floating weight can be changed without requiring a complicated work.

5 Claims, 4 Drawing Sheets

U.S. PATENT DOCUMENTS

| | | | |
|---|---|---|---|
| 5,520,455 A | 5/1996 | Yamada et al. | |
| 5,529,390 A * | 6/1996 | Giani et al. | 366/76.6 |
| 5,783,983 A | 7/1998 | Ureshino et al. | |
| 5,865,535 A * | 2/1999 | Edwards | 366/76.7 |
| 6,261,487 B1 * | 7/2001 | Bongaerts et al. | 264/40.5 |
| 6,402,360 B1 * | 6/2002 | Nortey | 366/85 |
| 6,811,295 B2 * | 11/2004 | Koro et al. | 366/97 |
| 6,817,748 B2 * | 11/2004 | Campanelli et al. | 366/76.2 |
| 6,908,221 B2 | 6/2005 | Proni et al. | |
| 7,314,305 B2 * | 1/2008 | Proni et al. | 366/145 |
| 2002/0159327 A1 * | 10/2002 | Proni et al. | 366/76.7 |
| 2004/0085851 A1 * | 5/2004 | Campanelli et al. | 366/76.7 |
| 2004/0096385 A1 * | 5/2004 | Proni et al. | 423/335 |
| 2004/0179424 A1 * | 9/2004 | Yamada et al. | 366/76.8 |
| 2004/0213075 A1 * | 10/2004 | Proni et al. | 366/76.7 |
| 2007/0025176 A1 * | 2/2007 | Naoi | 366/76.7 |

FOREIGN PATENT DOCUMENTS

| | | |
|---|---|---|
| EP | 1 236 504 A1 | 9/2002 |
| JP | 1-262934 | 10/1989 |
| JP | 3-13244 | 1/1991 |
| JP | 9-206581 | 8/1997 |
| JP | 9-254147 | 9/1997 |
| JP | 9-254148 | 9/1997 |
| JP | 11-916 | 1/1999 |
| JP | 2001-232632 | 8/2001 |
| JP | 2005-103897 | 4/2005 |
| JP | 2007054824 A * | 3/2007 |
| TW | 313945 | 8/1997 |
| TW | 390836 | 5/2000 |
| TW | 495382 | 7/2002 |
| TW | I236413 | 7/2005 |
| WO | WO 99/49960 | 10/1999 |

* cited by examiner

BATCH MIXER

BACKGROUND OF THE INVENTION

1. Field of the Invention

The present invention relates to a batch mixer that mixes mixing materials, particularly to a batch mixer having a constitution where a floating weight for pressing the mixing materials into a mixing chamber is elevated and lowered.

2. Description of the Prior Art

A batch mixer of this type is disclosed in U.S. Pat. No. 5,783,983, for example. Herein, the mixer is constituted that a hydraulic cylinder for lowering the floating weight to be pressed to the mixing chamber side is provided, a pneumatic/hydraulic pressure converter that converts pressure between a hydraulic pressure side and a pneumatic pressure side is provided separately from a mixer main body, and the hydraulic pressure side of the hydraulic cylinder is connected to the hydraulic pressure side of the pneumatic/hydraulic pressure converter. In this batch mixer, the mixing materials are gradually led into the mixing chamber by lowering the floating weight while a cushioning function is properly exerted on the weight by the air pressure of the pneumatic/hydraulic pressure converter, and the mixing materials can be mixed smoothly.

Further, the above-described batch mixer is provided with a direction switching solenoid valve for switching the advance/withdrawal of the hydraulic cylinder and an ON/OFF-type limit switch for monitoring the movement of the floating weight to be elevated and lowered, and is constituted that the direction switching solenoid valve is switched in response to a signal from the limit switch when the weight reaches a lower limit position to stop the lowering of the weight.

In such a batch mixer, demands for new mixing methods such that mixing is performed while a weight position is fixed on various positions and pressing pressure of the weight is arbitrarily controlled in pressing or mixing materials are increasing due to circumstances such as diversified mixing materials in recent years.

However, since the batch mixer of U.S. Pat. No. 5,783,983 detects the position of the floating weight by an ON/OFF signal from the limit switch, the position of the floating weight must be changed in order to change the weight position, and its labor was complicated.

Further, in the above-described batch mixer, the pneumatic/hydraulic pressure converter must be installed around the batch mixer, and a large installing space was required. Additionally, in the above-described batch mixer, it is theoretically possible to change the pressing pressure of the weight by changing air supply to the air pressure side of the pneumatic/hydraulic pressure converter, but a large volume of air supply/discharge is necessary if the control of changing the weight pressing pressure by a large amount, and a long time is taken in changing pressure as well, so that it was virtually impossible to perform pressure control within a predetermined mixing time.

Furthermore, although a type of mixer for lowering the floating weight by a pneumatic cylinder is conventionally known as the batch mixer, it required a large pneumatic cylinder and there was a room for improvement from the viewpoint of equipment cost and space. In addition, a large volume of air was required for elevating/lowering the weight, running cost was increased, and it was not preferable from the viewpoint of energy saving too. Moreover, because it is a positional control using air being compressed fluid, it was difficult to control the position of the weight at various positions with good accuracy, and the control of changing the weight pressing pressure by a large amount within a predetermined mixing time was also difficult similar to the above-described U.S. Pat. No. 5,783,983.

SUMMARY OF THE INVENTION

Problems to be solved by the present invention are as described above, and means for solving the problems and their effects will be described below.

According to the viewpoint of the present invention, a batch mixer having the following constitution is provided. The batch mixer of the present invention is made up of the followings: a mixer main body; a hopper provided for the mixer in a communicated state and into which mixing materials are charged; a floating weight provided in the hopper; a hydraulic cylinder that elevate/lower the floating weight; a positional detection device capable of continuously detecting the elevating/lowering position of the floating weight; position setting means for setting the elevating/lowering position of the floating weight; and a positional control device that controls the elevating/lowering position of the floating weight based on a positional detection signal of the positional detection device and a set value of the position setting means. Herein, the positional control device controls the action of the hydraulic cylinders so as to match the elevating/lowering position of the floating weight to the positional set value. Herein, the positional control device may output a stop signal to stop the action of the hydraulic cylinder when the positional detection signal matches the positional set value, for example.

This allows the positional detection device to detect that the floating weight reached an arbitrary set position, and the action of the hydraulic cylinder can be stopped based on the detection to stop the floating weight. Accordingly, even in the case where the stop position of the floating weight needs to be changed in order to change the capacity of the mixing chamber, only the setting by position setting means is required, and the complicated work (such as the changing of the installing position of the limit switch in U.S. Pat. No. 5,783,983) can be omitted. Further, since the stopping of the floating weight is realized by the action stop of the hydraulic cylinder, accuracy of the positional control of the floating weight is good compared to the above-described constitution by the pneumatic cylinders, a facility space and cost can be reduced, and a cost-saving constitution can be formed.

In the above-described batch mixer, it is preferable that the position setting means be constituted to be capable of setting the set value of the elevating/lowering position of the floating weight in plural numbers.

This makes it possible to switch the position of the floating weight during mixing quite easily. Additionally, the set value of the elevating/lowering position of the floating weight can be set in plural numbers in response to a predetermined operating condition, the position of the floating weight during mixing can be easily switched in response to various operating conditions, and it is possible to sensitively and flexibly deal with various mixing methods.

It is preferable that the above-described batch mixer include a switch valve that stops the supply of pressure oil into the hydraulic cylinder by the stop signal to stop the action of the hydraulic cylinder.

This realizes the stopping of the floating weight at a set position by a simple constitution without providing a special stop mechanism.

It is further preferable that the above-described batch mixer have the following constitution. Specifically, the batch mixer includes: a pressure sensor that detects the pressure of pressure oil working onto the floating weight pressurizing side of the hydraulic cylinder; a pressure setting device that sets the pressure of pressure oil working onto the floating weight pressurizing side of the hydraulic cylinder; a remote-operating relief valve that lets out pressure oil, which is supplied from a hydraulic source to the hydraulic cylinder, to a tank side; and a pressure control device that controls the remote-operating relief valve based on the pressure detection signal of the pressure sensor and the pressure set value of the pressure setting means. This pressure control device outputs a command signal to the remote-operating relief valve so as to match the pressure detection signal to the pressure set value.

Consequently, unlike the constitution having the pneumatic/hydraulic converter of U.S. Pat. No. 5,783,983, the pressing pressure of the floating weight can be changed by adjusting the relief pressure of the relief valve, so that the control of the weight pressing pressure accompanied by pressure change of a large amount can be performed quickly. Further, the weight pressing pressure can be controlled directly and with good response compared to the constitution where the weight pressing pressure is controlled (only) by the positional change of floating weight.

In the batch mixer, it is preferable that the pressure setting means be constituted to be capable of setting the set value of pressure in plural numbers.

Consequently, the weight pressing pressure during mixing can be easily switched in response to various operational conditions, and it is possible to sensitively and flexibly deal with various mixing methods.

In the batch mixer, it is preferable that a motor for driving a hydraulic pump as the hydraulic source of the hydraulic cylinders be a variable-speed motor, such as an inverter motor.

This makes possible to more sensitively adjust the moving speed of the floating weight and the rising time of pressure oil.

DESCRIPTION OF THE PREFERRED EMBODIMENTS

Figure 1:
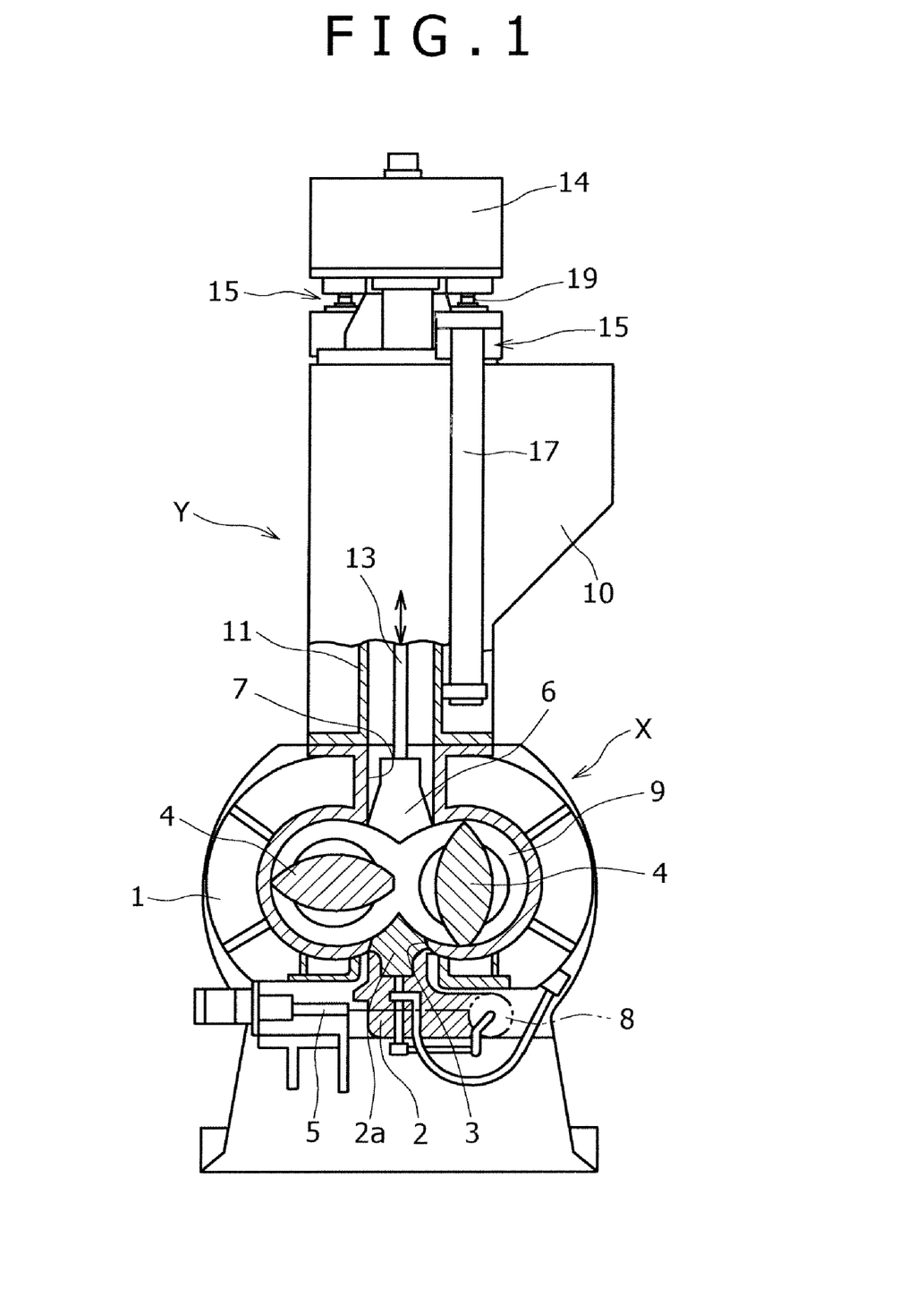
FIG. 1 is a partial sectional view showing the entire constitution of a batch mixer.

Next, description will be made for an example of the entire constitution of the batch mixer according to an embodiment of the present invention with reference to FIG. 1. FIG. 1 is the partial sectional view showing the entire constitution of the batch mixer.

A batch mixer X whose entire constitution is shown in FIG. 1 is an apparatus that mixes mixing materials such as rubber and resin, for example, and it includes a chamber 1 as a mixer main body having a mixing chamber 9 therein, mixing rotors 4 that mix the mixing materials in the mixing chamber 9, and a floating weight 6 for pressing the mixing materials into the mixing chamber 9 with a predetermined pressure, as primary constitutions.

In the chamber 1, the mixing chamber 9 having a cross-section of a shape, where two circular shapes are laid horizontally and partially connected to each other, is formed. A supply port 7 is formed on the upper portion of the central area in the transverse direction of the mixing chamber 9, and a discharge port 3 is formed on the lower portion thereof. The floating weight 6 is arranged in the supply port 3 of the upper side, and a door top 2a of a drop door 2 is arranged in the discharge port of the lower side. The section of the mixing chamber 9 is formed hermetically by the inner wall of the chamber 1, the lower portion of the floating weight 6 and the door top 2a of the drop door 2 so as to present the above-described shape.

A hopper 11 is provided on the upper portion of the chamber 1 while it is connected to the supply port 7, and the hopper 11 includes a charge port 10 of mixing materials. On the other hand, the drop door 2 disposed on the lower portion of the chamber 1 is constituted to be capable of switching close/open of the discharge port 3 by an open/close mechanism 8. Consequently, the discharge port 3 can be closed during mixing while the discharge port 3 can be opened after finishing mixing to discharge the mixing materials in the mixing chamber 9.

Further, the batch mixer X includes a latch 5, and the latch 5 is constituted that it pushes the drop door 2 toward the chamber 1 side during mixing to hold the hermetic property inside the mixing chamber 9 when mixing the mixing materials, and on the other hand, the latch 5 is withdrawn from the drop door 2 to allow the drop door 2 to be opened after mixing.

The two rotating rotors 4 are arranged inside the mixing chamber 9, and each rotor 4 is driven to rotate by a drive motor (not shown). Each rotor 4 is driven to rotate by the drive motor so as to sweep the inner wall of the mixing chamber 9, and mixes rubber, resin or the like that is charged from the charge port 10 into the hopper 11 (mixer main body) and pressed from the supply port 7 into the mixing chamber 9 by lowering the floating weight 6.

The floating weight 6 is arranged inside the hopper 11, and the floating weight 6 is freely movable in a sliding manner in the vertical direction. The floating weight 6 is integrally connected to a connecting beam 14 that constitutes a part of a weight device Y via a rod (shaft member) 13. The weight device Y is a device for adjusting the vertical movement of the floating weight 6 and the pressing pressure to the mixing materials, and it is constituted by unifying the floating weight 6 with the connecting beam 14 and connecting two hydraulic cylinders 15, 15. The two hydraulic cylinders 15, 15 are arranged so as to sandwich the hopper 11 to avoid the charge port 10 for mixing materials.

Figure 2:
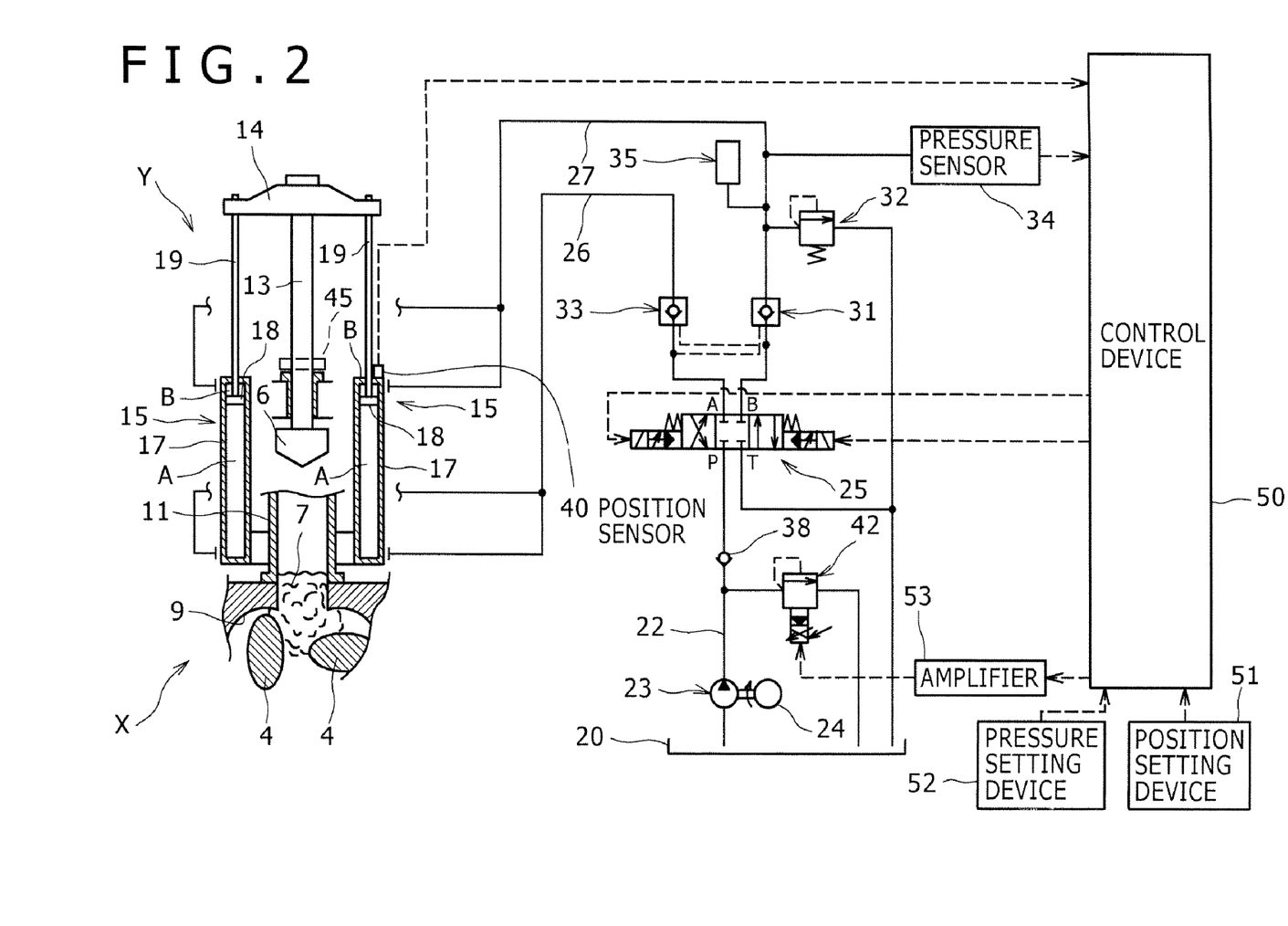
FIG. 2 is a hydraulic pressure circuit diagram showing the constitution of a hydraulic weight device of the batch mixer.

Next, a specific constitution of the weight device Y will be described. In FIG. 1 and FIG. 2, the weight device Y includes the connecting beam 14, where the rod 13 is integrally fixed on the central portion of the beam 14 in a T-shape, and the two hydraulic cylinders 15, 15 that are connected to the both ends of the connecting beam 14 as primary constitutions.

As shown in FIG. 2, the two hydraulic cylinders 15, 15 are constituted in dual movement cylinders, and a piston 18 is installed in the cylinder chamber in each cylinder main body 17 freely movable in a sliding manner. The inner space of the cylinder chamber is sectioned into two hydraulic chambers A, B by the piston 18. One hydraulic chamber B out of the two hydraulic chambers A, B generates hydraulic force in the direction for lowering the floating weight 6 and pressing in the mixing materials, and is a pressure chamber of the pressurizing side of floating weight. The other hydraulic chamber A is a pressure chamber generating hydraulic force in the direction for elevating the floating weight 6. A hydraulic circuit that constitutes a part of the weight device Y is connected to the hydraulic chambers A, B as shown in FIG. 2 as an example.

Movable rods 19 that are extended to or withdrawn from the cylinder main bodies 17 are connected to the pistons 18. The movable rods 19 extend upward from the cylinder main bodies 17 and are severally connected to the both ends of the connecting beam 14.

A linear scale 40 as a position sensor is provided at an appropriate position of the hydraulic cylinder 15. The linear scale 40 is constituted as a magnetic sensor of an absolute type, which reads a magnetic scale installed to the movable rod 19 of the hydraulic cylinder 15, and it is constituted to be capable of detecting the position of the movable rod 19 (eventually, the position of floating weight 6) continuously and seamlessly. The signal of a linear position of the floating weight 6, which is detected by the linear scale 40, is transmitted to a control device 50 of the weight device Y In this constitution, when pressure oil is supplied to the hydraulic chamber A in each hydraulic cylinder 15, the movable rod 19 extends upward to elevate the connecting beam 14, by which the floating weight 6 goes up inside the hopper 11. On the other hand, when pressure oil is supplied to the hydraulic chamber B, the movable rod 19 is withdrawn downward to lower the connecting beam 14, by which the floating weight 6 goes down toward the mixing chamber 9.

Next, the hydraulic circuit will be described by referring to FIG. 2. This hydraulic circuit has a hydraulic pump (hydraulic source) 23, which is driven by a drive motor 24 and aspirates operating oil from a hydraulic tank 20 to output it into a supply pipeline 22, and a direction switching solenoid valve 25 for switching the elevating/lowering/stop of the floating weight 6. The drive motor 24 is a variable-speed motor that is driven by inverter control.

A pilot operating type relief valve (remote-operating relief valve) 42 capable of remote-controlling the pressure of the supply pipeline 22 continuously and seamlessly is connected to the supply pipeline 22. A pressure signal (command signal) from the control device 50 is amplified by an amplifier 53 and input to a solenoid of the pilot portion of the pilot operating type relief valve 42. In this constitution, when the pressure signal from the control device 50 is input, attraction corresponding to its current value is generated in the solenoid to press a valve body, and the relief pressure of the relief valve 42 can be changed.

The supply pipeline 22 is connected to P port of the direction switching solenoid valve 25 that will be described below. Note that a check valve 38 for preventing reverse flow is provided for the supply pipeline 22.

The direction switching solenoid valve 25 has the P port connected to the supply pipeline 22, T port connected to the hydraulic tank 20, and A port and B port which are severally connected to the hydraulic chambers A, B of the two hydraulic cylinders 15, 15, and its valve body can be switched to each position by sending an operating signal from the control device 50 to magnetically exciting/erasing the solenoid.

The supply pipeline 22 is connected to the P port of the direction switching solenoid valve 25 as described above. Further, the hydraulic chambers A of the two hydraulic cylinders 15, 15 are connected to the A port via an operating pipeline 26, and the hydraulic chambers B of the two hydraulic cylinders 15, 15 are similarly connected to the B port via an operating pipeline 27.

A pilot check valve 33 is arranged on the operating pipeline 26 that is connected to the A port of the direction switching solenoid valve 25. This pilot check valve 33 is constituted that it blocks flow going from the hydraulic cylinders 15,15 to the direction switching solenoid valve 25 under a normal state while it permits a flow in the opposite direction. However, the pilot pipeline of the pilot check valve 33 is connected to the operating pipeline 27 of the B port side, the pilot check valve 33 is forcibly opened when the pressure of the operating pipeline 27 increases, and the flow going from the hydraulic cylinders 15, 15 to the direction switching solenoid valve 25 is permitted.

A pilot check valve 31 is arranged on the operating pipeline 27 that is connected to the B port of the direction switching solenoid valve 25. This pilot check valve 31 is constituted that it blocks flow going from the hydraulic cylinders 15, 15 to the direction switching solenoid valve 25 under a normal state while it permits a flow in the opposite direction, similar to the pilot check valve 33. However, the pilot pipeline of the plot check valve 31 is connected to the operating pipeline 26 of the A port side, the pilot check valve 31 is forcibly opened when the pressure of the operating pipeline 26 increases, and the flow going from the hydraulic cylinders 15, 15 to the direction switching solenoid valve 25 is permitted.

Moreover, a relief valve 32 is connected to the operating pipeline 27. This relief valve 32 should be on a position where it cuts off a line between the operating pipeline 27 and the pressure oil tank 20 by a valve spring under a normal state. On the other hand, the relief valve is constituted that a pilot pressure introduced from the operating pipeline 27 pushes the valve body against the valve spring when the pressure of the operating pipeline 27 abnormally rises, and the operating pipeline 27 and the pressure oil tank 20 are allowed to communicate with each other to let out the pressure oil.

Further, a pressure sensor 34 that measures the pressure of the operating pipeline 27 (eventually, a so-called ram pressure) is connected to the operating pipeline 27, and a pressure signal detected by the pressure sensor 34 is to be input to the control device 50 of the weight device Y. Furthermore, a piston-type accumulator 35 in which high-pressure nitrogen gas is filled is connected to the operating pipeline 27, and it is constituted to be capable of absorbing/buffering the pressure fluctuation of the operating pipeline 27.

The control device 50 of the weight device Y includes a CPU, a ROM, a RAM, a timer circuit and the like. Various sensors (including the pressure sensor 34) for monitoring the operation status of the batch mixer X are connected to the control device 50. Further, a position setting device (position setting means) 51 and a pressure setting device (pressure setting means) 52 are electrically connected to the control device 50. This position setting device 51 includes a ten-key, for example, and the position of the floating weight 6 can be set through inputting from the ten-key. In addition, the pressure of the floating weight 6 can be set through inputting from the ten-key in the pressure setting device 52 as well.

In this embodiment, the position setting device 51 is constituted to be capable of setting the set value of the stop position of the above-described floating weight 6 in plural numbers corresponding to various operating conditions (various operating conditions and operating status are considered such as each predetermined time, each predetermined pressure, predetermined barrel temperature, predetermined cooling water temperature and predetermined mixing material temperature, for example). The pressure setting device 52 is also constituted similarly to be capable of setting the pressing pressure of the floating weight 6 in plural numbers corresponding to various operating conditions as described above. A plurality of set values, which was set by the setting devices 51, 52, is stored in a RAM or the like (storage means) of the control device 50, and appropriately read out to be used according to an operating condition.

In the case of elevating the floating weight 6 in the above-described constitution, the drive motor 24 of the hydraulic circuit is driven to output operating oil from the hydraulic pump 23 into the supply pipeline 22, the control device 50 sends an elevating signal to the direction switching solenoid valve 25 to switch the direction switching solenoid valve 25, and the A port and the B port are respectively connected to the P port and the T port. Then, pressure oil supplied from the P port into the operating pipeline 26 passes the pilot check valve 33 and is supplied to the hydraulic chambers A of the two hydraulic cylinders 15, 15. Consequently, the pistons 18 and the movable rods 19 move upward and the floating weight 6 goes up. Pressure oil in the hydraulic chambers B on the opposite side is discharged from the cylinder main bodies 17 into the operating pipeline 27 by the elevation of the pistons 18, and the discharged pressure oil passes the pilot check valve 31, which is forcibly opened, and is returned to the pressure oil tank 20 via the B port to the T port of the direction switching solenoid valve 25.

FIG. 2 shows the state where the floating weight 6 is elevated to a position near the upper limit, and the lowering action of the floating weight 6 is performed as follows after the mixing materials are charged from the charge port 10 under this condition. Specifically, the control device 50 sends a lowering signal to the direction switching solenoid valve 25 to switch the direction switching solenoid valve 25, and the A port and the B port are respectively connected to the T port and the P port. Then, pressure oil supplied from the P port into the operating pipeline 27 passes the pilot check valve 31 and is supplied to the hydraulic chambers B of the two hydraulic cylinders 15, 15. Consequently, the pistons 18 and the movable rods 19 move downward and the floating weight 6 goes down. Pressure oil in the hydraulic chambers A on the opposite side is discharged from the cylinder main bodies 17 into the operating pipeline 26 by the elevation of the pistons 18, and the discharged pressure oil is returned to the pressure oil tank 20 via the A port to the T port of the direction switching solenoid valve 25 after passing the pilot check valve 33 that is forcibly opened.

As described, the direction switching solenoid valve 25 severally connects the A port to the T port and the B port to the P port, supplies pressure oil to the hydraulic chamber B (hydraulic chamber of pressuring side) of each hydraulic cylinder 15 to allow the movable rods 19 to withdraw into the cylinder main bodies 17, and the mixing materials are pressed (pressurizes) into the mixing chamber 9 with proper pressing force by the floating weight 6 that is connected to the movable rods 19 via the connecting beam 14 and the rod 13. Then, the rotors 4, 4 rotating in the mixing chamber 9 mix the mixing materials.

Herein, since the rotors 4, 4 in the mixing chamber 9 rotate so as to lead a part of the mixing materials into the mixing chamber and push up the rest of the materials outside the mixing chamber 9, the floating weight 6 becomes ready to go up a little receiving the pushing-up force. However, because the accumulator 35 is connected to the operating pipeline 27 that is connected to the hydraulic chambers B on the pressurizing side, the floating weight 6 can receive the pushing-up in a buffering manner (cushioning operation). As described, by lowering the floating weight 6 as the cushioning function is exerted, it is possible to gradually lead the mixing materials into the mixing chamber 9 to mix the materials by the rotation of rotors 4.

Further, during the lowering of the above-described floating weight 6, the pressure in the hydraulic chambers B on the floating pressurizing side is detected by the pressure sensor 34 every second as the pressure of operating pipeline 27, and the pressure signal is input to the control device 50. Then, the control device 50 sends a command signal to the pilot-operating type relief valve 42 via an amplifier 53 in order to bring the detected pressure of the pressure sensor 34 to a pressure corresponding to a set pressure by the pressure setting device 52. As a result, it is possible to easily and quickly change the pressing pressure of the floating weight 6 to the mixing materials through the pressure change of the supply pipeline 22.

Moreover, during the lowering action of the above-described floating weight 6, a positional signal detected by the linear scale 40 is input to the control device 50 every second. Then, when the position detected by the linear scale 40 becomes equal to a position that was previously set by the position setting device 51, the control device 50 sends a stop signal to the direction switching solenoid valve 25 to switch the direction switching solenoid valve 25 to a closing position, and blocks the A port and the B port. Consequently, supply/discharge of pressure oil to/from the hydraulic chamber A, B of the hydraulic cylinders 15 is stopped, so that the floating weight 6 can be stopped accurately at a position set by the position setting device 51.

As described above, the batch mixer X of this embodiment includes the floating weight 6, which is freely elevatable by the hydraulic cylinders 15, 15, in the hopper 11 that is provided for the chamber 1 in a communicated state and into which the mixing materials are charged. Then, the apparatus includes the linear scale 40 capable of continuously detecting the elevating/lowering position of the floating weight 6, the position setting device 51 that sets the elevating/lowering position of the floating weight 6, and the control device 50 that controls the elevated position of the floating weight 6 based on the positional detection signal of the linear scale 40 and the set value of the position setting device 51. The control device 50 outputs the stop signal in order to stop the action of the hydraulic cylinders 15, 15 when the positional detection signal to be output from the linear scale 40 matches the set value by the position setting device 51.

Consequently, the linear scale 40 can detect that the floating weight 6 reached an arbitrary set position, and the action of the hydraulic cylinders 15 can be stopped based on the detection. Therefore, even when the stop position of the floating weight 6 needs to be changed in order to change the capacity of the mixing chamber 9, for example, only the setting by the position setting device 51 is required, and the complicated work (such as the changing of the installing position of the limit switch in U.S. Pat. No. 5,783,983) can be omitted. In other words, the elevating/lowering position of the floating weight 6 can be set with very high degree of freedom.

Further, since the stop of the floating weight 6 is realized by the action stop of the hydraulic cylinders 15, the accuracy of positional control of the floating weight 6 is good compared to a constitution by pneumatic cylinders of conventional technology. Furthermore, because there is no need to install a pneumatic/hydraulic pressure converter of a large-scale constitution, application to conventional batch mixers of hydraulic cylinder type is easy.

Further, the batch mixer X of this embodiment is constituted to be capable of setting a plurality of elevating/lowering positions by the position setting device 51. Therefore, the position of the floating weight 6 in mixing can be switched very easily. Additionally, the apparatus is constituted to be capable of setting a plurality of the elevating/lowering positions corresponding to a predetermined operating condition. Therefore, the position of the floating weight 6 in mixing can be easily switched corresponding to various operating conditions, and it is possible to flexibly deal with various mixing methods. For example, a fine pattern of the elevated position of the floating weight 6 can be realized corresponding to the progress of mixing, the ingredients of mixing materials, or the like, and the control pattern of the elevating/lowering position can be also changed very easily.

Still further, the batch mixer X of this embodiment includes the direction switching solenoid valve 25 that stops the supply of pressure oil to the hydraulic cylinders 15, 15 by the stop signal from the control device 50 and stops the action of the hydraulic cylinders 15, 15. Therefore, the stopping of the floating weight 6 at the set position can be realized by a simple constitution without providing a special stop device.

Then, the batch mixer X of this embodiment includes the pressure sensor 34 that detects the pressure of the pressure oil working on the pressurizing side for floating weight 6 of the hydraulic cylinders 15, 15 (side from which floating weight 6 is lowered), the pressure setting device 52 that sets the pressure of the pressure oil working on the pressurizing side for floating weight of the hydraulic cylinders 15, and the pilot-operating type relief valve 42 that lets out pressure oil, which is supplied from the hydraulic pump 23 to the hydraulic cylinders 15, 15, to the pressure oil tank 20 side. Then, the control device 50 is constituted to output the command signal to the pilot-operating type relief valve 42 so as to match the pressure detection signal and the pressure set value. Therefore, unlike the above-described constitution having the pneumatic/hydraulic converter of U.S. Pat. No. 5,783,983, the pressing pressure of the floating weight 6 can be changed by adjusting the relief pressure of the relief valve 42, so that the control of the weight-pressing pressure accompanied by large pressure change can be performed quickly.

Further, weight-pressing pressure can be controlled directly with good response compared to a constitution that air supply pressure is changed to control weight-pressing pressure. Furthermore, the weight-pressing pressure can be remote-controlled by the pilot-operating type relief valve 42, which eliminates the on-site confirmation of weight-pressing pressure and pressure adjustment work, and management cost can be suppressed significantly.

Moreover, in the batch mixer X of this embodiment, the pressure setting device 52 is constituted to be capable of setting a pressure in plural numbers in order to change it corresponding to predetermined operating conditions. Therefore, the weight pressing pressure in mixing can be easily switched corresponding to various operating conditions, and it is possible to flexibly deal with various mixing methods. For example, a fine pattern of the pressing pressure can be realized corresponding to the progress of mixing, the ingredients of mixing materials, or the like, and the control pattern of the elevated position can be also changed very easily.

Further, in the batch mixer X of this embodiment, the accumulator 35 is connected to the pressurizing side for floating weight (operating pipeline 27). This makes it possible to impart a so-called cushioning function in lowering the floating weight 6 by a compact and low cost constitution.

Furthermore, the drive motor 24 of the hydraulic pump 23 is a variable-speed motor of an inverter control method in this embodiment. Therefore, by performing varying-speed control to the drive motor 24 by the drive signal from the control device 50, the moving speed of the floating weight 6 and the rising time of pressure oil can be adjusted more finely.

Although the preferred embodiment of the present invention has been described above, the above-described constitution can be changed and executed.

Figure 3:
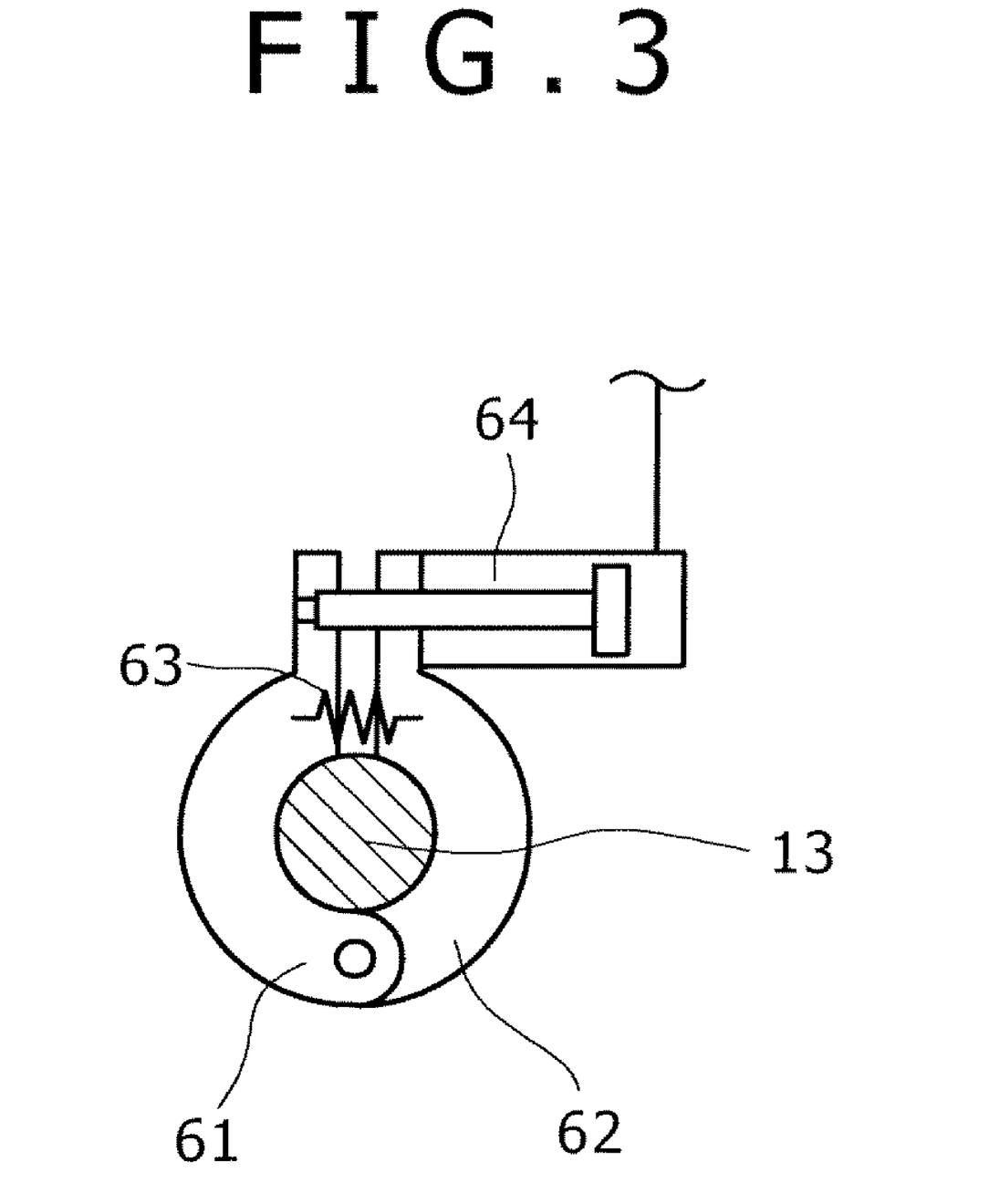
FIG. 3 is a principal portion plan view showing a mechanical lock mechanism in a modified example.

Instead of the constitution that the stop signal is input from the control device 50 to the direction switching solenoid valve 25 and the valve body is switched to a closed position to stop the hydraulic cylinders 15, 15, the constitution can be changed to a constitution that the hydraulic cylinders 15 and the floating weight 6 are stopped by providing a mechanical lock mechanism (reference numeral 45 in FIG. 2) for the rod 13 and inputting the stop signal from the control device 50 to the lock mechanism 45. As an example of the mechanical lock mechanism 45, a constitution including: a pair of brake members 61, 62 that is provided in a vertical movement unable manner and capable of sandwiching the rod 13; a fastening spring 63 that applies energizing force in the direction where the pair of brake members 61, 62 fastens the rod 13; a hydraulic cylinder 64 capable of driving the pair of brake members 61, 62 in the fastening-release direction resisting against the energizing force of the fastening spring 63 by supplying pressure oil; and a solenoid valve (not shown) that can be switched so as to discharge the pressure oil of the hydraulic cylinder 64 by inputting the stop signal from the control device 50, is considered as shown in the principal portion plan sectional view of FIG. 3. Further, it is also possible to change the mechanical lock mechanism 45 to a constitution including the movable rod 19 instead of the rod 13.

The linear scale 40 as the position sensor (position detecting device) can be changed to an ultrasonic type, an optical type or the like, for example, instead of the above-described magnetic type. Alternatively, it can be changed to a type that a rotary encoder or a rotating sensor such as a potentiometer is combined with a mechanism that converts the linear movement of the movable rods 19 into rotary movement.

In the embodiment, the linear scale 40 acquires the elevated position of the floating weight 6 by detecting the advanced amount of the movable rods 19, but it can be changed to a constitution that the elevating/lowering position of the floating weight 6 is acquired by detecting the position of the connecting beam 14 or the rod 13.

Instead of the accumulator 35 of a nitrogen-filled type, it can be changed to an arbitrary hydraulic accumulator such as a type that converts pressure into the positional energy of weight and a type that converts pressure into the elastic energy of spring.

In the above-described embodiment, supply of pressure oil to the hydraulic cylinders 15, 15 was stopped when the direction switching solenoid valve 25 was switched by the stop signal from the control device 50, but it can be changed to a constitution that the supply of pressure oil to the hydraulic cylinders 15, 15 is stopped by another method. For example, a solenoid switch valve capable of continuously changing an open level is used, and the open level of the solenoid switch valve may be controlled corresponding to a deviation between a set value and a detected value of the elevating/lowering position of the floating weight 6.

The drive motor 24 was the variable-speed motor of an inverter control type in the above-described embodiment, but it can be changed to a variable-speed motor of another method.

Figure 4:
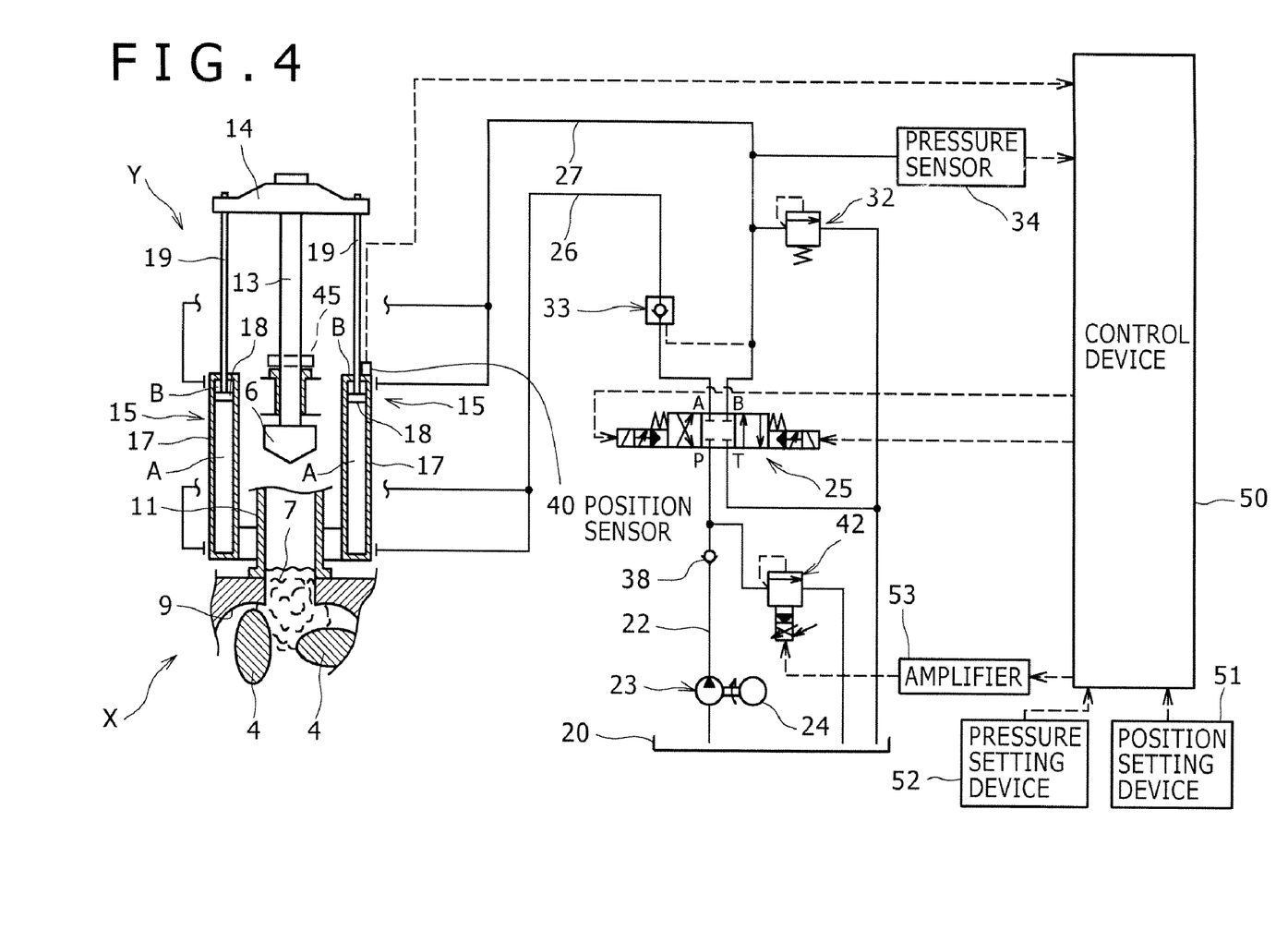
FIG. 4 is a modified hydraulic pressure circuit diagram showing the constitution of a hydraulic weight device of the batch mixer.

In the case of controlling pressure by using the pilot-operating type relief valve 42 in the above-described embodiment, the pressing pressure of the floating weight 6 can be controlled so as to exert the above-described cushioning function. In this case, the relief valve is arranged on a position where cylinder pressing force can be adjusted and the accumulator 35 can be omitted, as shown in FIG. 4, for example.

Alternatively, in the above-described embodiment, the pilot-operating type relief valve 42 is changed to a regular relief valve, which cannot remotely control the relief pressure, with a constitution where only the positional control of the floating weight 6 is performed.

What is claimed is:

1. A batch mixer, comprising:
   a mixer main body;
   a hopper provided for said mixer main body in a communicated state and into which mixing materials are charged;
   a floating weight provided in said hopper;
   a hydraulic cylinder that elevates/lowers said floating weight;
   a positional detection device including a sensor capable of continuously detecting an idicium of the elevating/lowering position of said floating weight and continuously outputting a positional detection signal;
   position setting means capable of setting the set value of the elevating/lowering position of said floating weight in plural numbers for setting the elevating/lowering position of said floating weight;
   a positional control device that controls the elevating/lowering position of said floating weight based on the positional detection signal of said positional detection device and a set value of said position setting means, wherein said positional control device controls the action of said hydraulic cylinder to match the elevating/lowering position of said floating weight to said positional set value;
   a pressure sensor that detects the pressure of pressure oil working onto said floating weight pressurizing side of said hydraulic cylinder;
   pressure setting means capable of setting the set value of the pressure in plural numbers for setting the pressure of pressure oil working onto said floating weight pressurizing side of said hydraulic cylinder;
   a remote-operating relief valve that lets out pressure oil, which is supplied from a hydraulic source to the hydraulic cylinder, to a tank side; and
   a pressure control device that controls said remote-operating relief valve based on a pressure detection signal of said pressure sensor and a pressure set value of said pressure setting means, wherein said pressure control device outputs a command signal to said remote-operating relief valve to match said pressure detection signal to said pressure set value.

2. The batch mixer according to claim 1, wherein said positional control device outputs a stop signal to stop the action of said hydraulic cylinder when said positional detection signal matches said positional set value.

3. The batch mixer according to claim 2, comprising:
   a switch valve that stops the supply of pressure oil into said hydraulic cylinder by said stop signal to stop the action of said hydraulic cylinder.

4. The batch mixer according to claim 1, wherein a motor for driving a hydraulic pump as the hydraulic source of said hydraulic cylinder is a variable-speed motor.

5. The batch mixer according to claim 1, wherein the remote-operating relief valve comprises a valve body and a solenoid that receives said command signal from said pressure control device and presses the valve body according to the command signal.

* * * * *